Feb. 16, 1960   G. C. LUEBKEMAN   2,925,077
TARGET TRAP
Filed March 9, 1956   2 Sheets-Sheet 1

INVENTOR.
George C. Luebkeman
BY
Murray, Sackhoff + Murray
ATT'YS

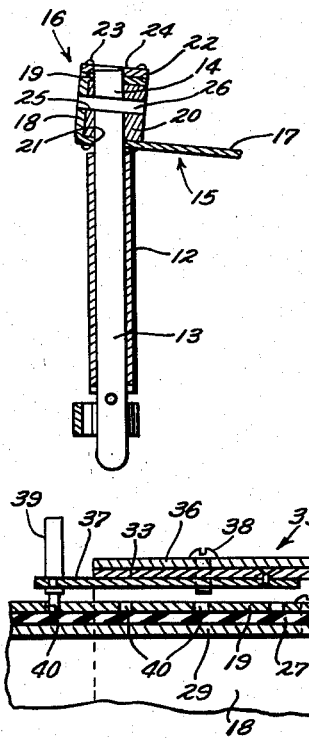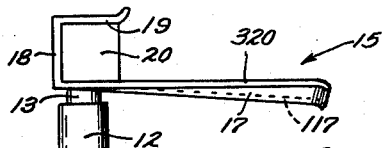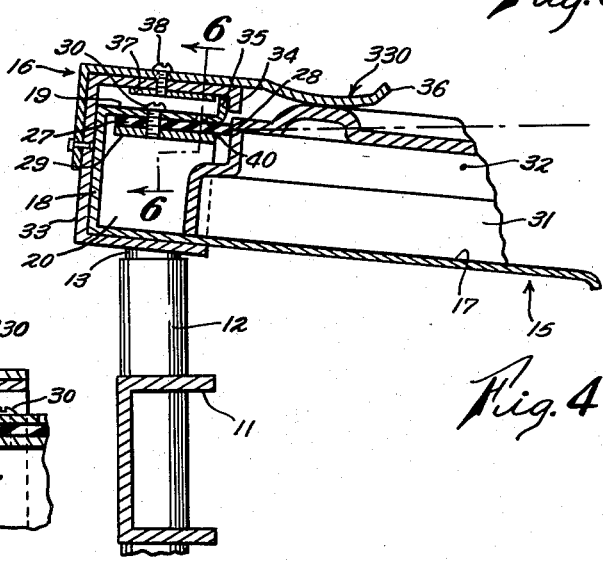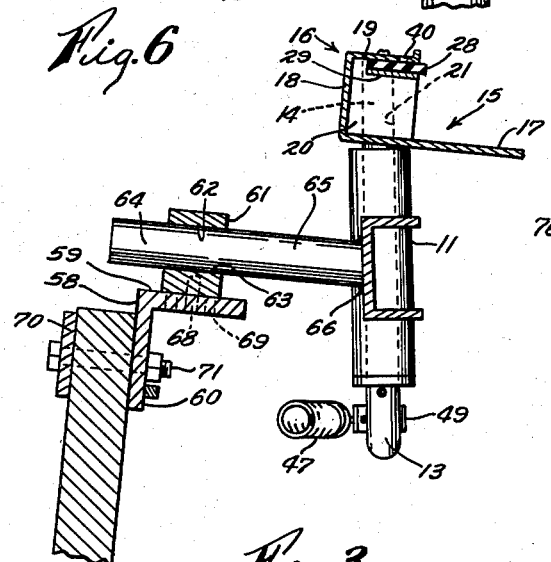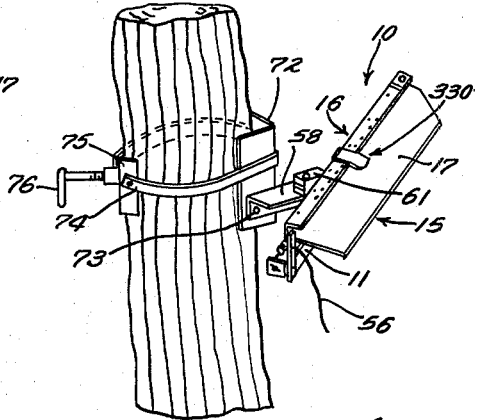
INVENTOR.
George C. Luebkeman
BY
Murray, Sackhoff & Murray
ATT'YS United States Patent Office 2,925,077
Patented Feb. 16, 1960

2,925,077
TARGET TRAP
George C. Luebkeman, Cincinnati, Ohio
Application March 9, 1956, Serial No. 570,435
6 Claims. (Cl. 124—8)

The present invention relates to projectors for aerial targets and is particularly directed to an improved spring trap utilized in the sport of shooting clay targets with firearms.

Another object is to provide a positive and dependable target projecting mechanism for a spring trap having the foregoing characteristics. In this respect it has been generally recognized that the weight and mountings of the heavier traps contributed to the smoothness of operation of their target throwing arms and the consequent even flight of the targets projected therefrom. I have found that dependable projecting mechanism producing even target flight could be made light enough for portability and also be adapted for selective mounting on objects heretofore considered unstable, by the expedient of maintaining a particular angularity of the target support plate for the throwing arm with respect to the path of movement of the said arm; as will more fully appear hereinafter.

A further object is to provide a light weight and extremely simplified target projecting arm construction for a spring trap that will provide smooth and level target flight.

With the foregoing and other objects in view my invention will be clearly understood from the following specification and the accompanying drawings which illustrate a preferred embodiment of the invention, and wherein:

Fig. 3 is a section taken on line 3—3 of Fig. 2.

Fig. 4 is an enlarged section taken on line 4—4 of Fig. 2.

Fig. 5 is a section taken on line 5—5 of Fig. 2.

Fig. 6 is a section taken on line 6—6 of Fig. 4.

Fig. 7 is a perspective view showing the trap mounted on the trunk of a tree.

Fig. 8 is an end view of a modified form of projecting arm for the trap shown in Figs. 1–7.

Figure 1:
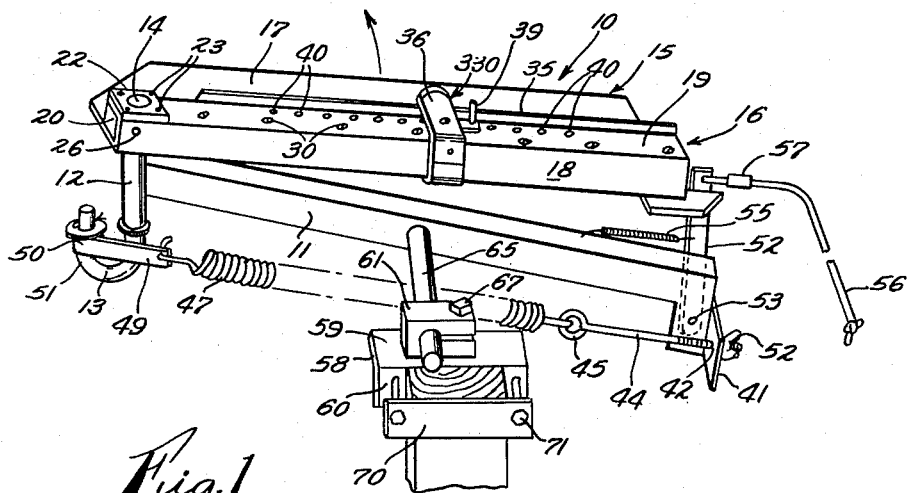
Fig. 1 is a perspective view of my spring trap depicting it in operative position prior to release of the spring loaded projecting arm therefor.

The embodiment of the invention comprises a spring trap 10 that has an elongated base member 11 made in channel form (Figs. 3 and 4) for strength and having an upstanding journal bearing 12 integrally formed on one end. A crank shaft 13 is journaled in the bearing 12 with its upper end 14 projecting beyond the bearing to rotatably mount a target throwing arm 15 upon the base member. As indicated in Fig. 1 the axis of the shaft 13 lies in the vertical plane of the elongated base and is at right angles to the longitudinal center line of the base.

As best shown in Figs. 2–5 the throwing and target supporting arm 15 has a hollow guide rail 16 formed along the entire longitudinal extent of the trailing edge portion of said arm. The arm 15 is a metal stamping preferably constructed from a light weight metal plate having an inclined target supporting portion 17 that terminates along its trailing edge portion in an upturned flange 18, positioned at right angles to said supporting portion, the terminal end portion of the plate being turned inwardly to form a top flange 19 that overhangs and is substantially parallel to the target supporting portion 17. An arm mounting block 20 is located at the pivoted end of the guide rail 16 and is interposed against the inside face of the flange 18 and between the trailing end of the target support portion 17 and the top flange 19 (Fig. 4), a bore 21 being formed at a compound angle through said end assemblage for receiving the upper end portion 14 of the shaft 13. A reenforcing plate 22 is secured to the outer face of the top flange 19 by rivets 23 going through the assembly, said plate having a central hole 24 for receiving the terminal end of the shaft portion 14. A transverse hole 25 is formed in said assemblage to receive a key or pin 26 that fixes the arm 15 on the shaft 13. A rubber strip 27 is secured to the underside of the flange 19 with its forward edge 28 extending beyond the flange to provide a frictional, target contacting member for the throwing arm, by means of a metal plate 29 located beneath the strip and drawn up against the strip by a row of screws 30 passing through the flange and strip and threaded in the plate.

It is to be noted with reference to Fig. 5 that when the arm is in operative position on the shaft 14 the axis of the bore 21 is normal to the longitudinal and lateral axes of the base member and is at approximately an angle of 8° with respect to the support portion 17 of the arm and divergent to the plane of the longitudinal center line of said base; the latter divergence causing the base and the arm to diverge outwardly from the journal bearing 12 when the arm is in operative spring loaded, target throwing position.

With reference to Fig. 8 a modified form of target supporting and throwing arm 15 is contemplated, the arm being depicted in said figure as comprising a target supporting portion 17 whose journaled edge portion 117 is disposed at an angle of eight (8°) degrees with respect to the conical path of the arm whilst the opposed terminal edge 320 of the target support portion lies in the conical path of the arm whereby the angularity of the support portion decreases progressively from the inner journal part of the arm to its free end to provide substantially horizontal flight for a target thrown by a trap equipped with the modification shown in Fig. 8.

By reason of the fact that the upper end 14 of shaft 13 passes through the bore 21 in the guide rail block 20 of arm 15, said guide rail 16 will rotate in a conical path around the shaft 13 during its throwing movement and return, and the inclined target supporting portion 17 of the arm will be carried by the arm in position such that it will be inclined downwardly from the bottom of the guide rail toward the leading edge of the arm at an angle of substantially eight (8°) degrees with respect to the said path of the rail. Thus, as shown in Fig. 4, when a target 31 is placed upon the supporting portion 17 the path of its center of gravity 32 will be considerably below the target engaging friction strip 28 of the guide rail 16 during the throwing action of the arm whereby upon release and movement of the spring loaded arm the target will move firmly upon the plate and be released therefrom over the free terminal edge portion 320 thus providing a positive and smooth flight for the target.

Heretofore a firm trap support and a rigid trap structure were considered to be important factors for successful projection of fragile clay targets. Because of the angularity between the path of the guide rail 16 and the target supporting portion 17 of the arm 15 the target is forced to closely hug the support portion during the throwing action of the arm and thus my trap can be mounted upon a flexing support where necessary and may also be made of relatively light material and yet provide satisfactory flight for the target projected therefrom.

Figure 2:
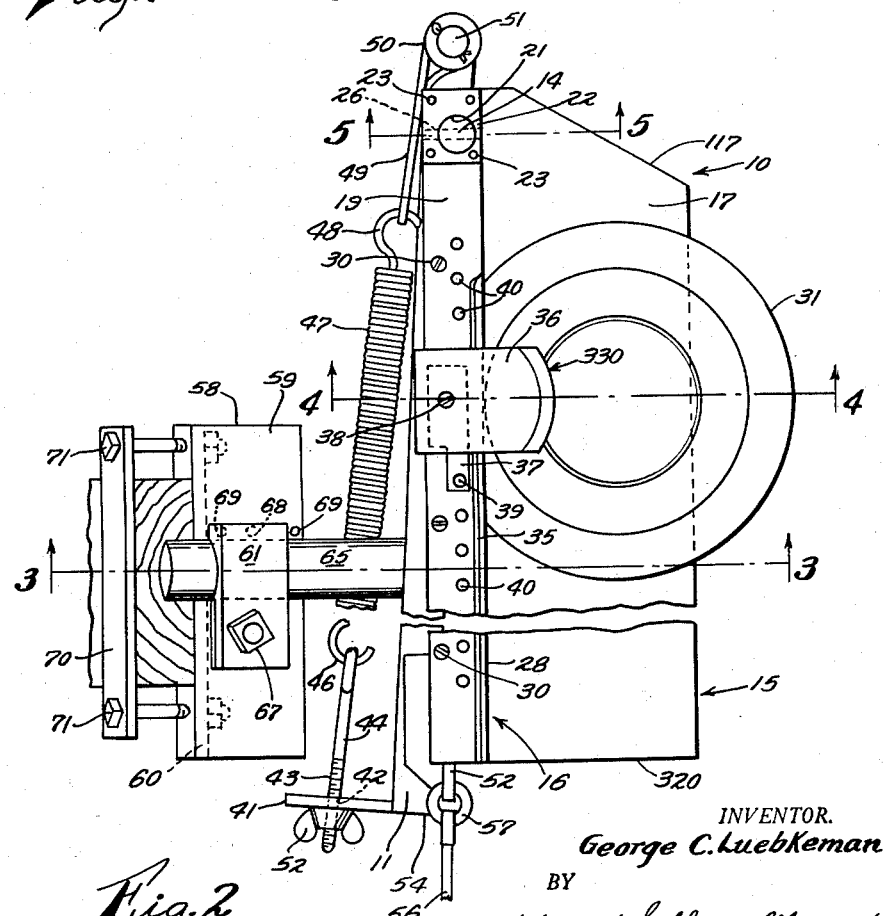
Fig. 2 is an enlarged, fragmental plan view of the trap shown in Fig. 1.

When it becomes necessary to temporarily hold the target 31 on the arm 15 a spring clip 330 may be utilized for holding the target in selected positions along the longitudinal extent of the target support portion 17. The clip is best shown in Figs. 2, 4 and 6 and comprises a U-shaped carrier or slide 33 that encircles the guide rail on the arm and is provided with a downturned positioning lip 34 which engages over an upturned edge portion 35 formed on the forward edge portion of the top flange 19. A target engaging spring finger 36 is mounted upon the carrier and a spring strip 37 is secured beneath the carrier both by a screw 38, the strip carrying a detent 39 which is manually insertable into any one of a number of holes 40 formed in a longitudinal row in the flange 19.

The end of the base 11 opposed to the journal bearing 12 is provided with an integral arm 41 which has an opening 42 therein for receiving the threaded end 43 of a spring adjustment shaft 44. The end of the shaft is provided with an eye 45 to receive the end hook 46 of a spring 47. The opposed end hook 48 of the spring is engaged in a link 49 which is pivotally mounted at 50 to the crank arm 51 of the shaft 13. By manually rotating the wing nut 52 threaded to the end of shaft 44 the throwing arm operating tension of the spring 47 may be regulated, as desired.

A trigger means for releasably maintaining the target throwing arm in operative spring loaded position comprises an arm engaging finger 52 pivotally mounted at 53 on an integral extension 54 of the base 11, said finger being urged into the latching position by spring 55 secured at one end to the arm and fixed at its opposite end to the base. A trigger release cord 56 is secured to the upper end of the arm engaging finger 52 by means of a knot or loop 57.

When the target 31 is placed upon the inclined support portion 17 near the mid-portion of the arm 15 and the trap operated, the customary, even flight of the target will result, whilst placing the target upon said portion 17 near either of the extreme end portions of the arm will produce erratic target flight resembling the flight of game birds.

The improved mounting means for the trap heretofore described comprises a section of angle iron 58 that has a flat support section 59 and a perforate, upstanding supporting section 60. The flat supporting section carries a split bearing block 61 having spaced arcuate openings 62 and 63 formed therein for receiving the end 64 of a mounting shaft 65. The shaft is welded or otherwise fixed at 66 to the central portion of the elongated base 11, it being noted with reference to Fig. 3 that the axis of the shaft 65 is parallel to the plane of the target support portion 17 of the arm 15. The shaft is secured to the mounting means in position to provide the desired trajectory path to a target by tightening a bolt 67 that passes through the split sections of block 61 and through a hole formed in the supporting flat section 59 of the mounting means. With reference to Fig. 3 it will be seen that the horizontal pattern of flight of a target from the trap may be regulated by a pin 68 anchored in and depending from the block 61 for selective insertion into one of a circular row of block positioning openings 69 having the center of the bolt 67 as its radius.

A strap 70 and bolts 71 may be used to surround the upper end of a suitable post to clamp the post firmly to the support section 60 by utilization of selected openings formed therethrough. When it is desired to mount the trap on a tree, as illustrated in Fig. 7, the upstanding supporting section is secured to another short section of angle iron 72. The sections are then secured together at right angles to each other by a bolt 73, an adjustable clamping strap 74 being passed around the tree trunk and the angle iron 72 and secured at its ends to an angle iron 75. A pullup device 76 may be associated with the angle iron 75 to tighten the strap 74 around the tree, if desired. It is obvious that a portable stand could be provided that could also be fastened by bolts to the upstanding support section 60 of the mounting means. Thus it will be seen that I have provided a mounting means for a trap that is readily adaptable for cooperation with a number of supporting objects found in the fields or which may be quickly and easily constructed for trap support.

It will therefore be understood that a higher target throwing velocity can be obtained with my trap without danger of target breakage because the target support portion 17 is inclined with respect to the guide rail thus bringing the center of gravity of the target below the guide rail whereby one component of the arm throwing force is exerted on the target body by the rail and the other component is exerted by the support portion 17 on the bottom of the target.

What is claimed is:

1. A target throwing device comprising an elongated base member, an upstanding crank shaft journaled in one end of the base member, a rotatable throwing arm having one end fixed to the upper end of the shaft, a trigger on the base cooperable with the free end portion of the arm for normally holding the arm against swinging movement, a spring connected between the shaft and base for actuating the arm, said arm being mounted on the shaft at a compound angle thereto to swing in a conical path having the extension of the axis of the shaft as its generating center, and said arm having an inclined target support plate projecting downwardly toward the leading edge of the arm and disposed at an acute angle with respect to the conical throwing path of the arm.

2. A target throwing device comprising a swinging arm, means supporting the arm for rotation in a circular throwing path, said arm having a longitudinal guide rail positioned along the trailing edge portion thereof, and a target support plate fixedly positioned with respect to the guide rail and projecting downwardly from beneath the guide rail toward the leading edge portion of the arm, said plate being disposed at an angle with respect to the circular throwing path of the swinging arm.

3. A target throwing device as set forth in claim 2 characterized by the fact that the angle between the plane of the plate and the circular throwing path of the swinging arm is about 8 degrees.

4. A target throwing device comprising a swinging arm, journal means fixed to one end portion of the arm for supporting said arm for rotation in a conical throwing path, said arm having a longitudinal guide rail positioned along the trailing edge portion thereof, and a target support plate angularly positioned when respect to the guide rail and projecting downwardly from beneath the guide rail toward the leading edge portion of the arm, said plate being thereby disposed at an angle to the conical throwing path of the swinging arm and having a progressively decreasing angularity with respect to the guide rail outwardly from the journaled end of the arm.

5. A target throwing device comprising a swinging arm formed from a metal stamping and having a target engaging guide rail portion formed along its trailing edge, means for supporting the guide rail portion of the arm for rotation in a conical throwing path, said stamping having a target support portion extending downwardly from the bottom of the guide rail and forwardly therefrom to form the leading edge portion of the arm, said target support portion being angularly disposed with respect to the conical throwing path of the guide rail such that the center of gravity of a target resting upon the target support portion is below the target engaging portion of the guide rail during movement of the arm through its throwing path.

6. A target throwing device comprising a swinging arm, journal means supporting one end of the arm, said arm having a leading target support portion and a hollow, longitudinal guide rail positioned along the trailing edge portion that is substantially square in section, an upturned edge portion formed upon the forward side of the rail, a U-shaped carrier encircling the trailing edge portion of the arm and having a downturned lip on its upper forward end for sliding engagement over the upturned edge portion, a spring clip secured to the carrier and overhanging the support portion of the arm, a row of holes formed in the upper face of the guide rail, and a detent means on the carrier for cooperation with the holes to lock the carrier in selected positions along the arm.

References Cited in the file of this patent

UNITED STATES PATENTS

| | | |
|---|---|---|
| 281,356 | Fischer | July 17, 1883 |
| 534,488 | Wright | Feb. 19, 1895 |
| 985,651 | Benner | Feb. 28, 1911 |
| 1,206,416 | Cosby | Nov. 28, 1916 |
| 1,459,421 | Slusher | June 19, 1923 |
| 1,880,326 | McCrea | Oct. 4, 1932 |
| 1,971,056 | Sutcliffe | Aug. 21, 1934 |
| 2,193,266 | Betts | Mar. 12, 1940 |
| 2,245,258 | Darrel | June 10, 1941 |
| 2,668,526 | Woolsey | Feb. 9, 1954 |